US009128675B2

(12) United States Patent  
Iwamoto et al.

(10) Patent No.: US 9,128,675 B2  
(45) Date of Patent: Sep. 8, 2015

(54) ELECTRONIC DEVICE

(71) Applicant: Panasonic Corporation, Kadoma-shi, Osaka (JP)

(72) Inventors: Akira Iwamoto, Osaka (JP); Yuji Sumino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 13/948,825

(22) Filed: Jul. 23, 2013

(65) Prior Publication Data

US 2014/0254091 A1 Sep. 11, 2014

(30) Foreign Application Priority Data

Mar. 6, 2013 (JP) .................. 2013-044141

(51) Int. Cl.
G06F 1/16 (2006.01)
(52) U.S. Cl.
CPC ................... G06F 1/1656 (2013.01)
(58) Field of Classification Search
CPC .................................... G06F 1/1656
USPC .......... 361/679.41, 679.55; 439/142; 455/575.1, 575.8
See application file for complete search history.

(56) References Cited

U.S. PATENT DOCUMENTS

| | | | | |
|---|---|---|---|---|
| 4,381,063 A * | 4/1983 | Leong | ........................... | 220/242 |
| 5,199,888 A * | 4/1993 | Condra et al. | ................ | 439/142 |
| 5,255,965 A * | 10/1993 | Chen et al. | ..................... | 312/7.1 |
| 5,331,506 A * | 7/1994 | Nakajima | ................ | 361/679.58 |
| 5,423,605 A * | 6/1995 | Liu | ............................. | 312/265.6 |
| 5,547,388 A * | 8/1996 | Hill | ............................... | 439/135 |
| 5,571,023 A * | 11/1996 | Anthony | ....................... | 439/142 |
| 5,574,625 A * | 11/1996 | Ohgami et al. | .......... | 361/679.09 |
| 5,738,536 A * | 4/1998 | Ohgami et al. | ............... | 439/142 |
| 5,848,719 A * | 12/1998 | Goldenberg | .................. | 220/326 |
| 5,947,762 A * | 9/1999 | Katsuma | ....................... | 439/468 |
| 6,222,726 B1 * | 4/2001 | Cha | .......................... | 361/679.32 |
| 6,267,608 B1 * | 7/2001 | Yagi | ............................. | 439/142 |
| 6,406,321 B1 * | 6/2002 | Hayashi et al. | ............... | 439/374 |
| 6,674,639 B2 * | 1/2004 | Wang et al. | .............. | 361/679.32 |
| 7,048,556 B2 * | 5/2006 | Stanton et al. | ................ | 439/135 |
| 7,123,487 B2 * | 10/2006 | Saito et al. | ..................... | 361/801 |
| 7,150,638 B1 * | 12/2006 | Fonville et al. | ............... | 439/148 |
| 7,189,084 B2 * | 3/2007 | Iikura | ........................... | 439/135 |
| 7,309,016 B2 * | 12/2007 | Lev et al. | ................. | 235/472.01 |
| 7,425,141 B2 * | 9/2008 | Kanayama et al. | ........... | 439/135 |

(Continued)

FOREIGN PATENT DOCUMENTS

JP 2011-248825 12/2011

*Primary Examiner* — Adrian S Wilson  
(74) *Attorney, Agent, or Firm* — Hamre, Schumann, Mueller & Larson, P.C.

(57) ABSTRACT

A mobile computer includes: an operation casing 2 including a right side face 2g, a top surface 2a, and a back surface 2d; a lid component 4 configured to cover a battery insertion/detachment opening 6a formed in the right side face 2g; and an engaged component 5 formed on the top surface 2a. The lid component 4 includes: a securing portion 4e secured to a part of the operation casing 2; a lid portion 4a configured to cover the battery insertion/detachment opening 6a; an engaging portion 4d having an engagement hole 4f that engages with the engaged component 5; a first bent portion 4c configured to connect between the securing portion 4e and the lid portion 4a; and a second bent portion 4b configured to connect between the lid portion 4a and the engaging portion 4d, so as to be integrated into the lid component 4.

9 Claims, 16 Drawing Sheets

(56) References Cited

U.S. PATENT DOCUMENTS

| | | | |
|---|---|---|---|
| 7,500,866 B2 * | 3/2009 | Gennai et al. | 439/367 |
| 7,798,828 B2 * | 9/2010 | Kuo | 439/142 |
| 8,199,464 B2 * | 6/2012 | Zuo et al. | 361/679.01 |
| 8,199,470 B2 * | 6/2012 | Yang | 361/679.02 |
| 8,223,484 B2 * | 7/2012 | Zhu | 361/679.56 |
| 8,226,131 B1 * | 7/2012 | Bruce et al. | 292/163 |
| 8,363,386 B2 * | 1/2013 | Cheng et al. | 361/600 |
| 8,454,101 B2 * | 6/2013 | Kuo | 312/296 |
| 8,513,522 B2 * | 8/2013 | Liang | 174/66 |
| 2002/0119697 A1 * | 8/2002 | Chan | 439/519 |
| 2004/0258336 A1 * | 12/2004 | Hou | 384/276 |
| 2005/0124191 A1 * | 6/2005 | Stanton et al. | 439/135 |
| 2009/0109635 A1 * | 4/2009 | Chen et al. | 361/728 |
| 2009/0141445 A1 * | 6/2009 | Lu | 361/679.55 |
| 2009/0256364 A1 * | 10/2009 | Gadau et al. | 292/128 |
| 2011/0058314 A1 * | 3/2011 | Cheng | 361/679.01 |

* cited by examiner

ELECTRONIC DEVICE

BACKGROUND

1. Field

The present disclosure relates to electronic devices having lid components that cover openings formed in casings.

2. Description of the Related Art

A water-sealing lid for sealing a terminal surface of a battery accommodated in an opening of a mobile information reading apparatus is disclosed in Japanese Laid-Open Patent Publication No. 2011-248825.

SUMMARY

The present disclosure is to make available an electronic device having a lid component that seals an opening from water.

An electronic device according to the present disclosure includes: a casing including a side surface, a top surface, and a back surface; a lid component configured to cover an opening formed in the side surface of the casing; and a projecting component formed on the top surface of the casing. The lid component includes: a securing portion secured to the back surface of the casing; a lid portion configured to cover the opening of the casing; an engaging portion having an engagement hole that engages with the projecting component of the casing; a first bent portion configured to connect between the securing portion and the lid portion, and a second bent portion configured to connect between the lid portion and the engaging portion, and the securing portion, the lid portion, the engaging portion, the first bent portion, and the second bent portion are integrated into the lid component.

The electronic device according to the present disclosure has a lid component that can seal an opening from water.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Hereinafter, a mobile computer (PC), called a laptop-type computer, having a display panel and an operation casing that rotatably engage with each other, will be described as an exemplary embodiment.

(Embodiments)

[Structure of Mobile Computer]

Figure 1:
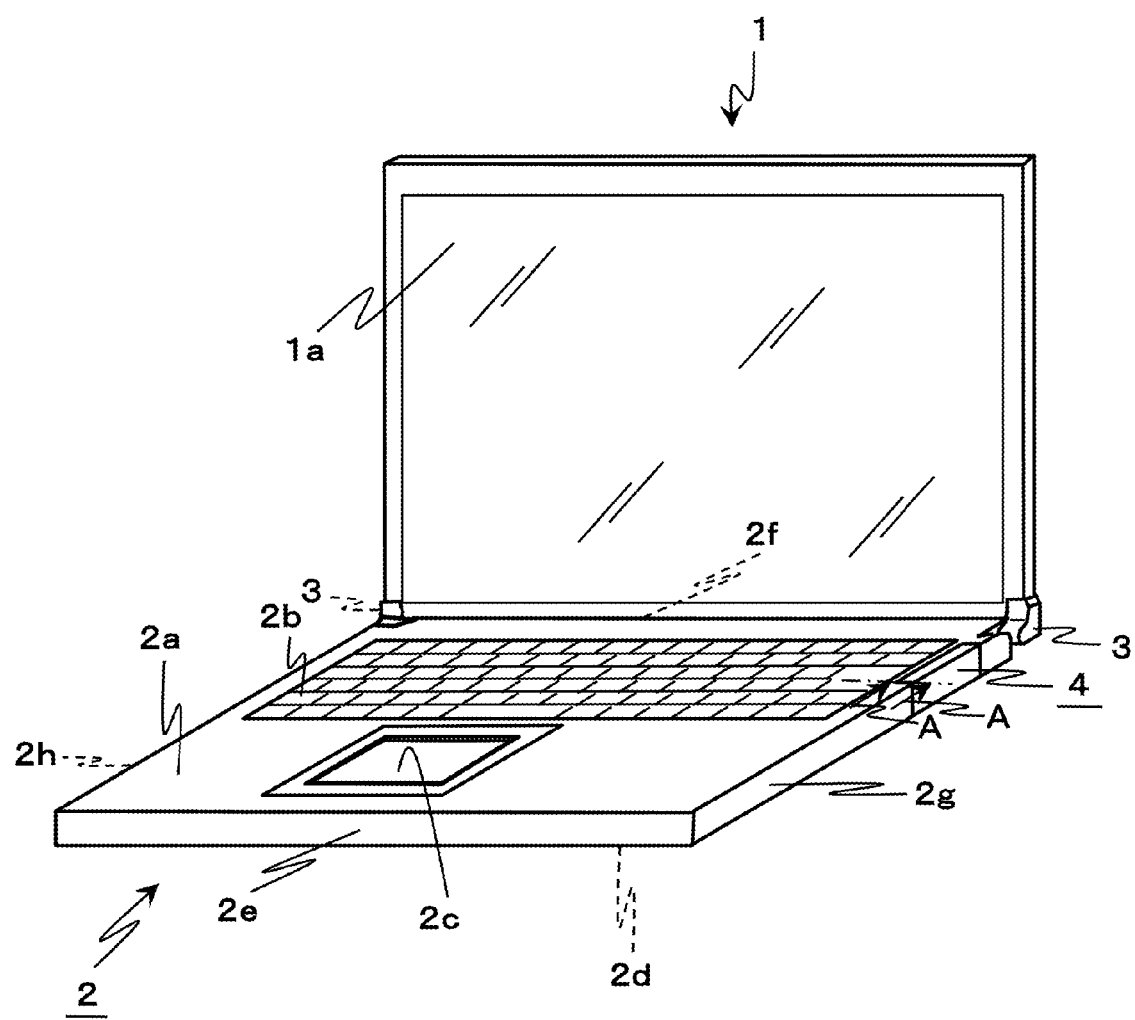
FIG. 1 is an external perspective view of a laptop type computer (PC)

FIG. 1 is a perspective view of the PC. The PC has a structure in which a display casing 1 and an operation casing 2 are supported by a hinge 3, so as to be openable and closable. In the display casing 1, a display panel 1a is disposed. The operation casing 2 includes: a top surface 2a having a keyboard 2b and an operation pad 2c disposed therein; a back surface 2d reverse to the top surface 2a; a front side face 2e that faces toward a user in a state shown in FIG. 1 where the user is allowed to view the display panel 1a; a rear side face 2f that opposes the front side face 2e through the keyboard 2b and the operation pad 2c; a right side face 2g located at the user's right hand; and a left side face 2h located at the user's left hand. The hinge 3 supports the display casing 1 and the operation casing 2 so as to be openable and closable by pivoting the display casing 1 about the operation casing 2. FIG. 1 shows the display casing 1 in an opened state. Further, a lid component 4 is disposed near the rear side face 2f on the right side face 2g of the operation casing 2. In the present embodiment, the lid component 4 is disposed on the rear side face 2f side of the right side face 2g. However, the lid component 4 may be disposed on the left side face 2h, the front side face 2e, or the rear side face 2f. Further, in the present embodiment, the lid component 4 covers a battery insertion/detachment opening 6a through which a battery 6 for driving the PC is inserted or detached.

[Structure of Lid Component]

Figure 2:
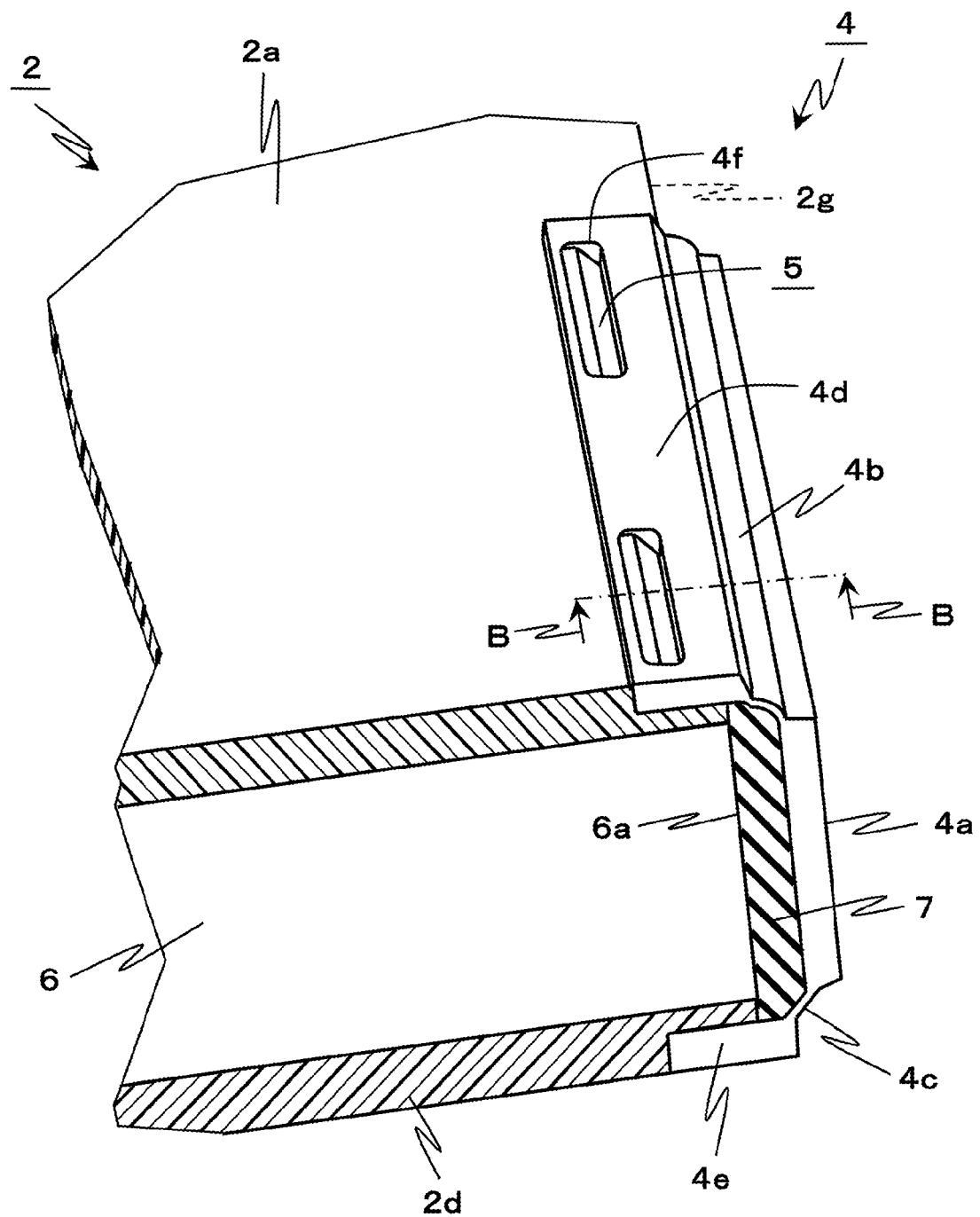
FIG. 2 is a cross-sectional perspective view of main components of the PC.
Figure 3A:
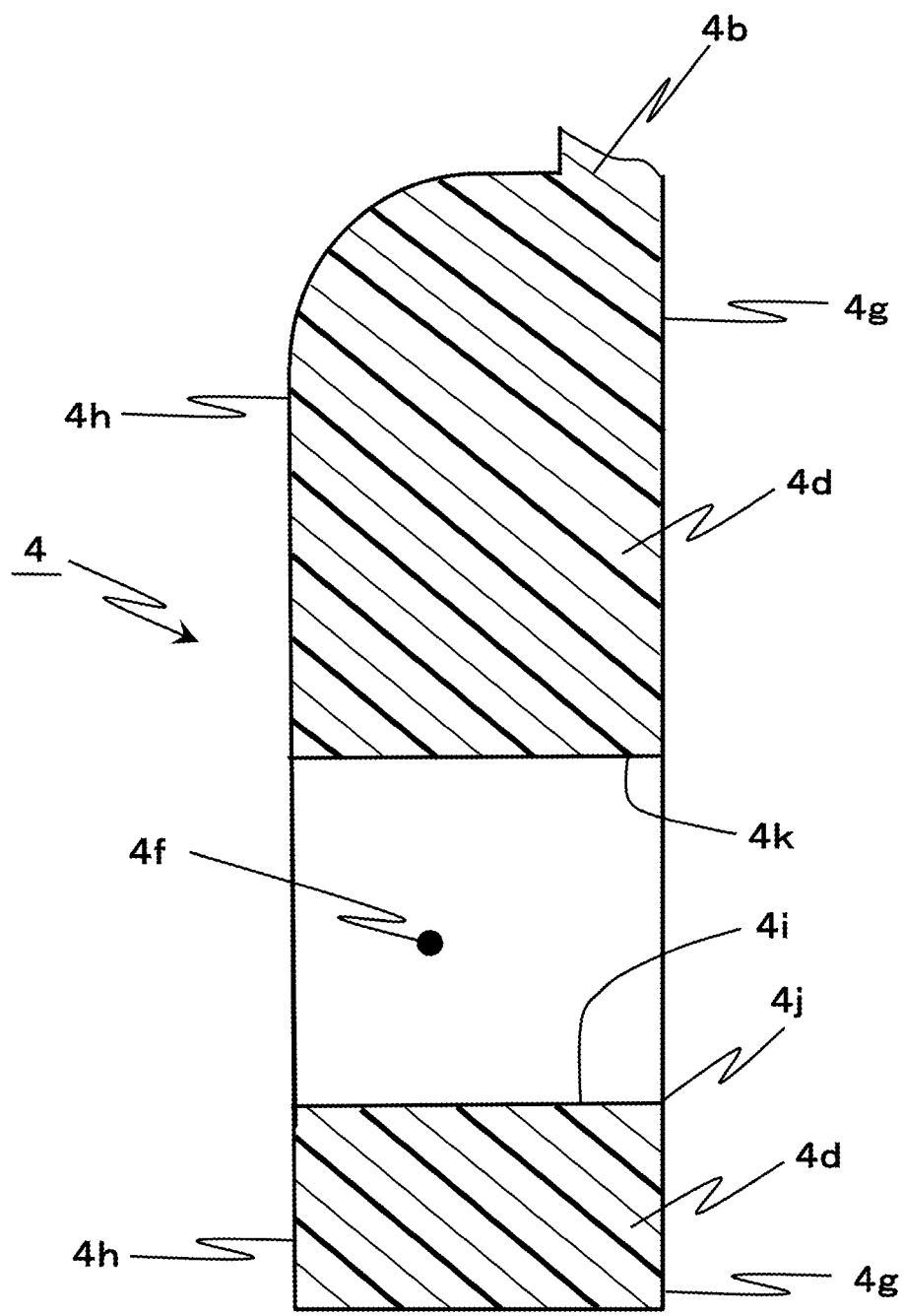
FIG. 3A is a cross-sectional view of main components of a lid component of the PC.
Figure 3B:
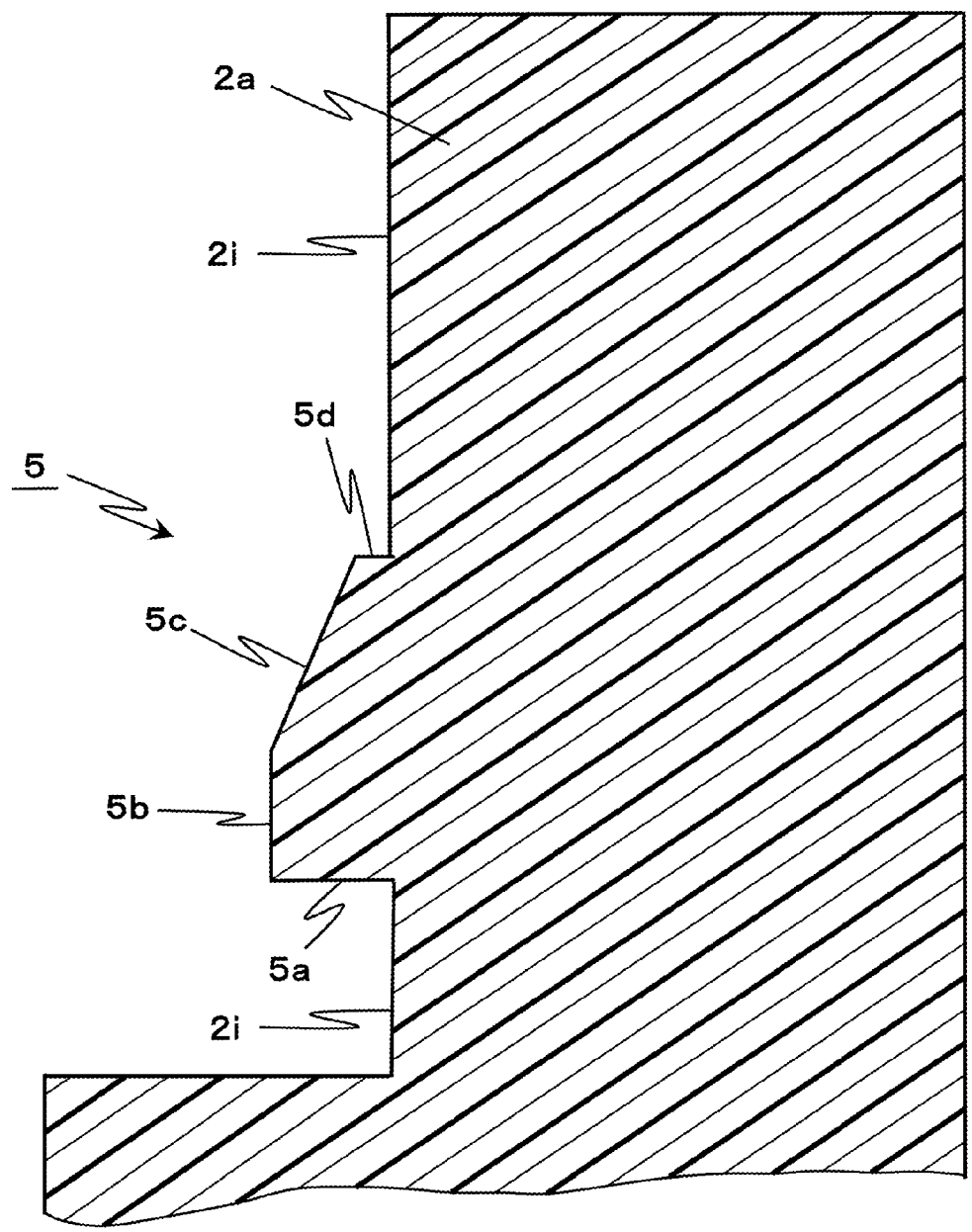
FIG. 3B is a cross-sectional view of main components of a casing of the PC.

FIG. 2 is a fragmentary perspective view taken in the direction of arrows A-A in FIG. 1, illustrating a cross-section, taken along A-A, of an enlarged vicinity of the lid component 4. Further, FIG. 3A and FIG. 3B are each a fragmentary view taken in the direction of arrows B-B in FIG. 2, illustrating a cross-section, taken along B-B, of an enlarged vicinity of the lid component 4. FIG. 3A illustrates a cross-section of an engaging portion 4d. FIG. 3B illustrates a cross-section of the front side face 2e of the operation casing 2 corresponding to a portion shown in FIG. 3A.

The lid component 4 includes a lid portion 4a, a second bent portion 4b, a first bent portion 4c, the engaging portion 4d, and a securing portion 4e. The lid portion 4a is integrated with the engaging portion 4d at one end through the second bent portion 4b, and is integrated with the securing portion 4e at the other end through the first bent portion 4c. The engaging portion 4d has engagement holes 4f formed as elongated holes along the right side face 2g. In the state shown in FIG. 2, engaged components 5 descried below are inserted into the engagement holes 4f of the engaging portion 4d. In the present embodiment, the engagement holes 4f have hole shapes that allow the engaged components 5 to pass through the engaging portion 4d from the engagement holes 4f, respectively. On the other hand, the securing portion 4e is secured to the back surface 2d. The securing portion 4e may be secured to the back surface 2d by using a securing manner such as adhesion using an adhesive, screwing using a screw, and the like. In the present embodiment, the securing portion 4e is adhered to the back surface 2d by means of a double-faced tape having adhesive surfaces on both sides. Further, in the present embodiment, the second bent portion 4b and the first bent portion 4c are each formed by an elastomeric resin having bendability and restorability. The lid portion 4a, the second bent portion 4b, and the engaging portion 4d are formed by the elastomeric resin as described above. The thickness of the lid portion 4a, the engaging portion 4d, and the securing portion 4e is different from the thickness of the second bent portion 4b and the first bent portion 4c. By changing the thickness, a mechanical characteristic of the lid portion 4a, the engaging portion 4d, and the securing portion 4e becomes different from a mechanical characteristic of the second bent portion 4b and the first bent portion 4c. Specifically, the thickness of the second bent portion 4b and the first bent portion 4c is less than the thickness of the lid portion 4a, the engaging portion 4d, and the securing portion 4e. Thus, the second bent portion 4b and the first bent portion 4c are allowed to exert a bending performance, and a portion of the lid component 4 is allowed to have a hinge-like function.

A portion around the battery insertion/detachment opening 6a formed in the right side face 2g is pressed by a water-sealing member 7. The battery 6 is accommodated in the operation casing 2 so as to maintain waterproof property by the portion around the battery insertion/detachment opening 6a being pressed by the water-sealing member 7. Namely, the battery insertion/detachment opening 6a is an example of an opening through which the battery 6 is inserted or detached. The water-sealing member 7 is formed by a foamable polyurethane resin that is deformed according to a pressing force and is restored when the pressing force is eliminated.

As shown in FIG. 3A, the engaging portion 4d includes: a top surface opposing face 4g that opposes the top surface 2a; a front layer face 4h forming a top surface of the engaging portion 4d; and the engagement holes 4f that pass through the engaging portion 4d from the front layer face 4h to the top surface opposing face 4g. The contour of each engagement hole 4f is a roughly rectangular parallelepiped. Each engagement hole 4f is formed by a second engaging surface 4k that is a surface on the second bent portion 4b side, a first engaging surface 4i that is a surface opposing the second engaging surface 4k through the engagement hole 4f, and a boundary portion 4j formed by an edge line of the first engaging surface 4i and an edge line of the top surface opposing face 4g.

Further, as shown in FIG. 3B, the top surface 2a has disposed thereon the engaged components 5 that are inserted into the engagement holes 4f, respectively, of the engaging portion 4d. Namely, the engaged components 5 represent an example of a projecting component that projects from the top surface 2a of the operation casing 2. The engaged components 5 are formed on an engaging portion opposing surface 2i of the top surface 2a which the engaging portion 4d opposes in a state where the engaged components 5 are inserted into the engagement holes 4f, respectively. Each engaged component 5 includes a first engaged surface 5a, a flat surface 5b, an inclined surface 5c, and a second engaged surface 5d. When the engaged component 5 is inserted into the engagement hole 4f, the first engaged surface 5a engages with the first engaging surface 4i of the engagement hole 4f. Further, in the present embodiment, the second engaged surface 5d is formed which engages with the second engaging surface 4k of the engagement hole 4f when the engaged component 5 is inserted into the engagement hole 4f. The flat surface 5b formed almost parallel to the engaging portion opposing surface 2i, and the inclined surface 5c that is inclined downward from the flat surface 5b toward the second engaged surface 5d are provided between the first engaged surface 5a and the second engaged surface 5d. Further, a height of the first engaged surface 5a which corresponds to a distance from the engaging portion opposing surface 2i to the flat surface 5b is greater than a height of the second engaged surface 5d which corresponds to a distance from the engaging portion opposing surface 2i to the right side face 2g side portion of the inclined surface 5c.

[Engagement Between Engaging Portion and Engaged Components]

An engagement between the engaged components 5 and the engaging portion 4d having such structures will be described with reference to FIG. 4A to FIG. 4E. FIG. 4A to FIG. 4E are each a fragmentary view taken in the direction of arrows B-B in FIG. 2.

Figure 4A:
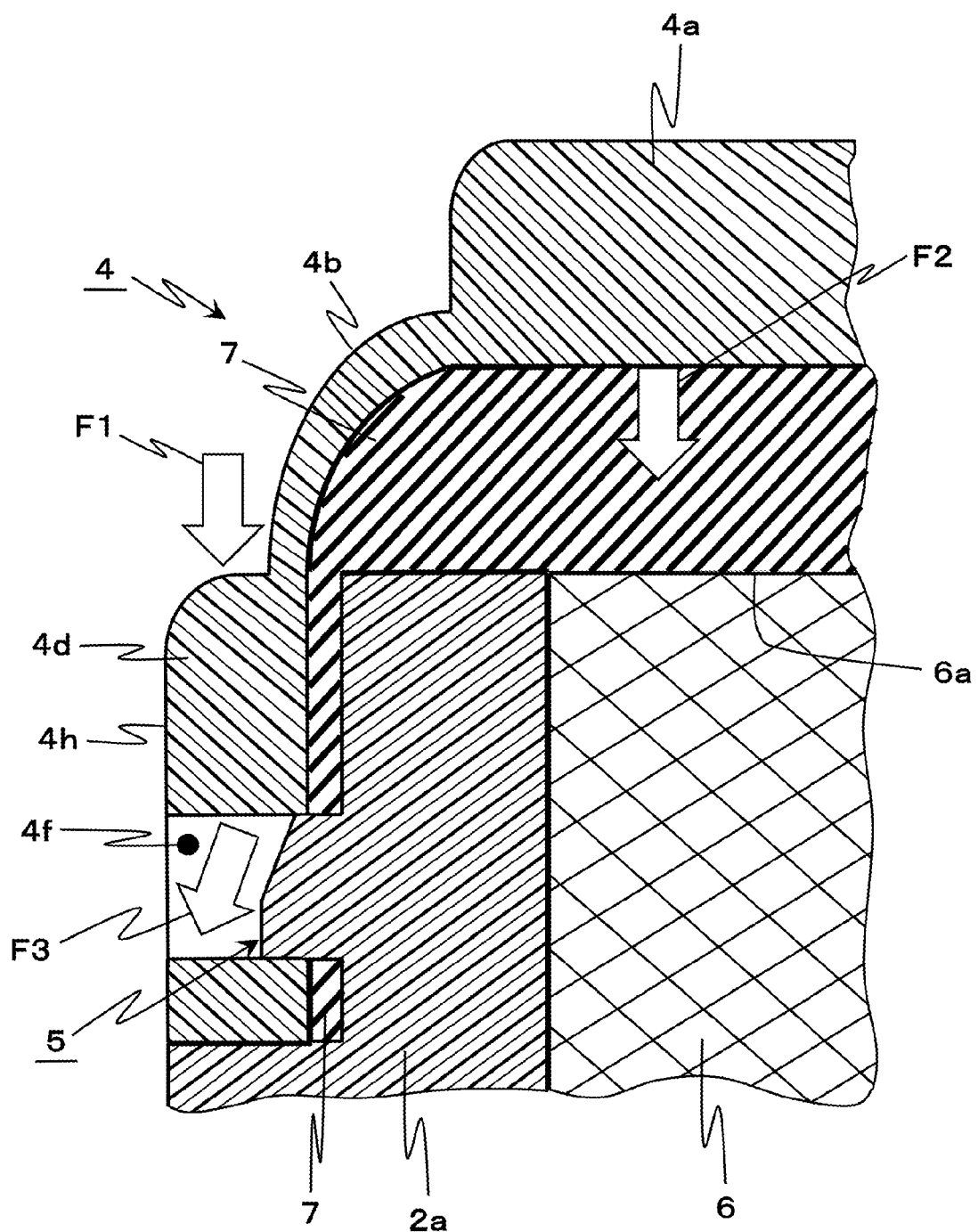
FIG. 4A is a cross-sectional view of a main portion for detaching the lid component for the PC from the casing.

FIG. 4A is an enlarged cross-sectional view illustrating a state where the engaged component 5 is inserted into the engagement hole 4f. The water-sealing member 7 is disposed between the top surface 2a, and the lid portion 4a, the second bent portion 4b, and the engaging portion 4d. A force is applied to the lid portion 4a due to the first bent portion 4c so as to move the lid portion 4a apart from the battery insertion/detachment opening 6a. Therefore, in a state where the engaged component 5 is inserted into the engagement hole 4f, the first engaging surface 4i of the engagement hole 4f abuts against the first engaged surface 5a of the engaged component 5 due to a drawing force. Therefore, when a user covers the battery insertion/detachment opening 6a with the lid portion 4a, a force greater than the drawing force is applied to the engaging portion 4d by the user. Namely, the user applies a force F1 that is greater than the drawing force, to a side surface of the engaging portion 4d on the second bent portion 4b side. The water-sealing member 7 is pressed by the lid portion 4a with a force F2 due to the force F1 being applied. Further, the thickness of the second bent portion 4b is less than the thickness of the lid portion 4a and the engaging portion 4d, and a material of the second bent portion 4b is an elastomeric resin. Therefore, the second bent portion 4b has its length slightly increased according to the water-sealing member 7 being pressed and deformed. By these factors being combined, a force F3 in a diagonal direction is applied so as to cancel the surface contact between the first engaging surface 4i of the engagement hole 4f, and the first engaged surface 5a. Further, as shown in the drawings, the force F3 is also applied so as to disengage the second engaging surface 4k and the second engaged surface 5d from each other. By these forces, the engaging portion 4*d* is moved apart from the top surface 2*a*, and the engaged component 5 is removed from the engagement hole 4*f*.

Figure 4B:
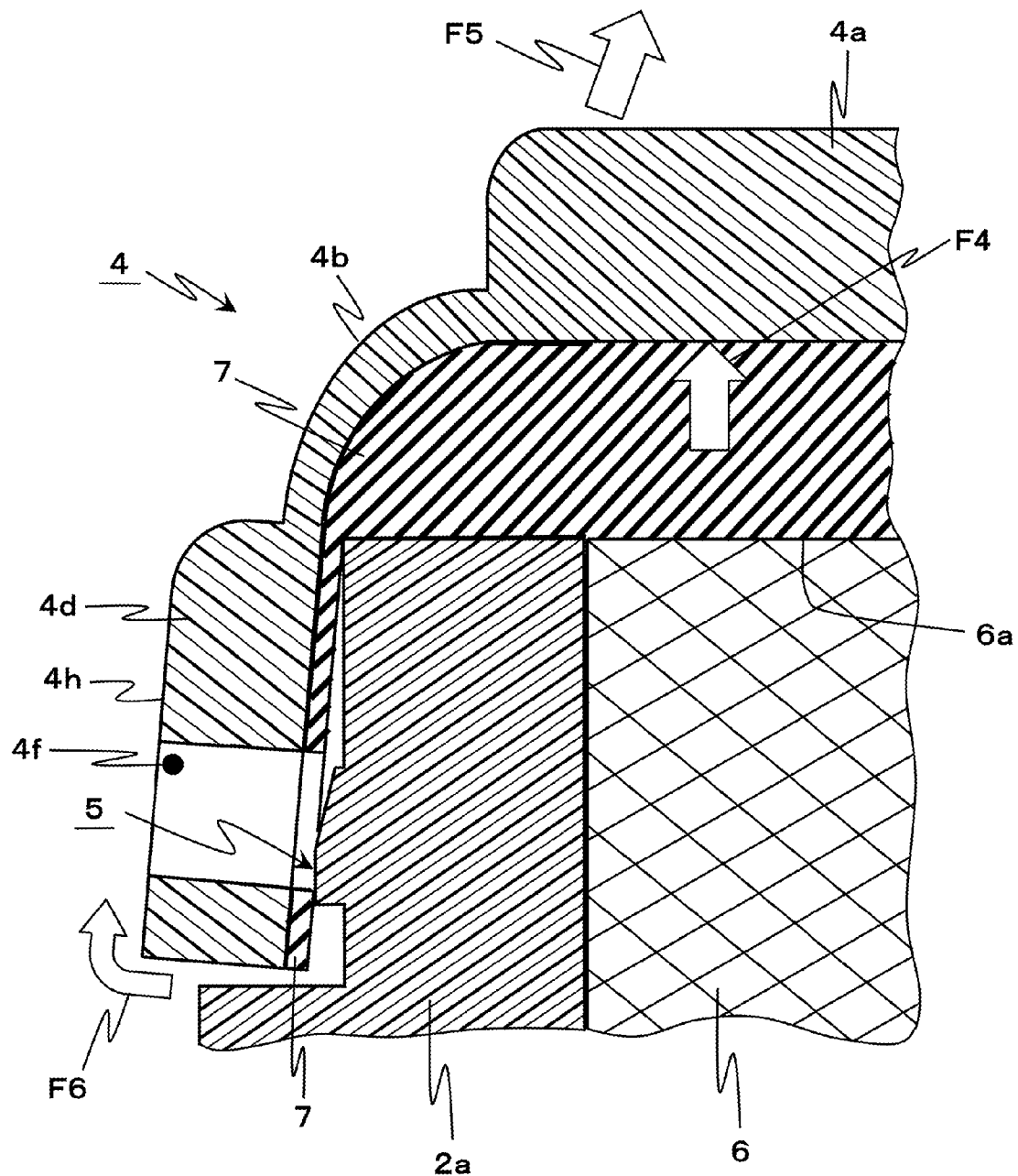
FIG. 4B is a cross-sectional view of the main portion for detaching the lid component for the PC from the casing.

FIG. 4B shows a state immediately after the first engaged surface 5*a* of the engaged component 5 has appeared from the engagement hole 4*f*. A force F4 for restoring the second bent portion 4*b* so as to have an original free length is applied to the lid portion 4*a* by the water-sealing member 7 that has been compressed by the lid portion 4*a*, due to the surface contact between the first engaging surface 4*i* and the first engaged surface 5*a* being canceled. Further, a force is applied, by the first bent portion 4*c*, so as to detach the lid portion 4*a* from the battery insertion/detachment opening 6*a*. Further, the elongation of the second bent portion 4*b* due to its elasticity also acts as such a force as to constrict the second bent portion 4*b*. By these factors being combined, a force F5 is applied to the lid portion 4*a*, and, as a result, a force F6 is applied to the engaging portion 4*d*. The boundary portion 4*j* (see FIG. 3A) is slid on the flat surface 5*b* and the inclined surface 5*c* due to the force F6 being applied.

Figure 4C:
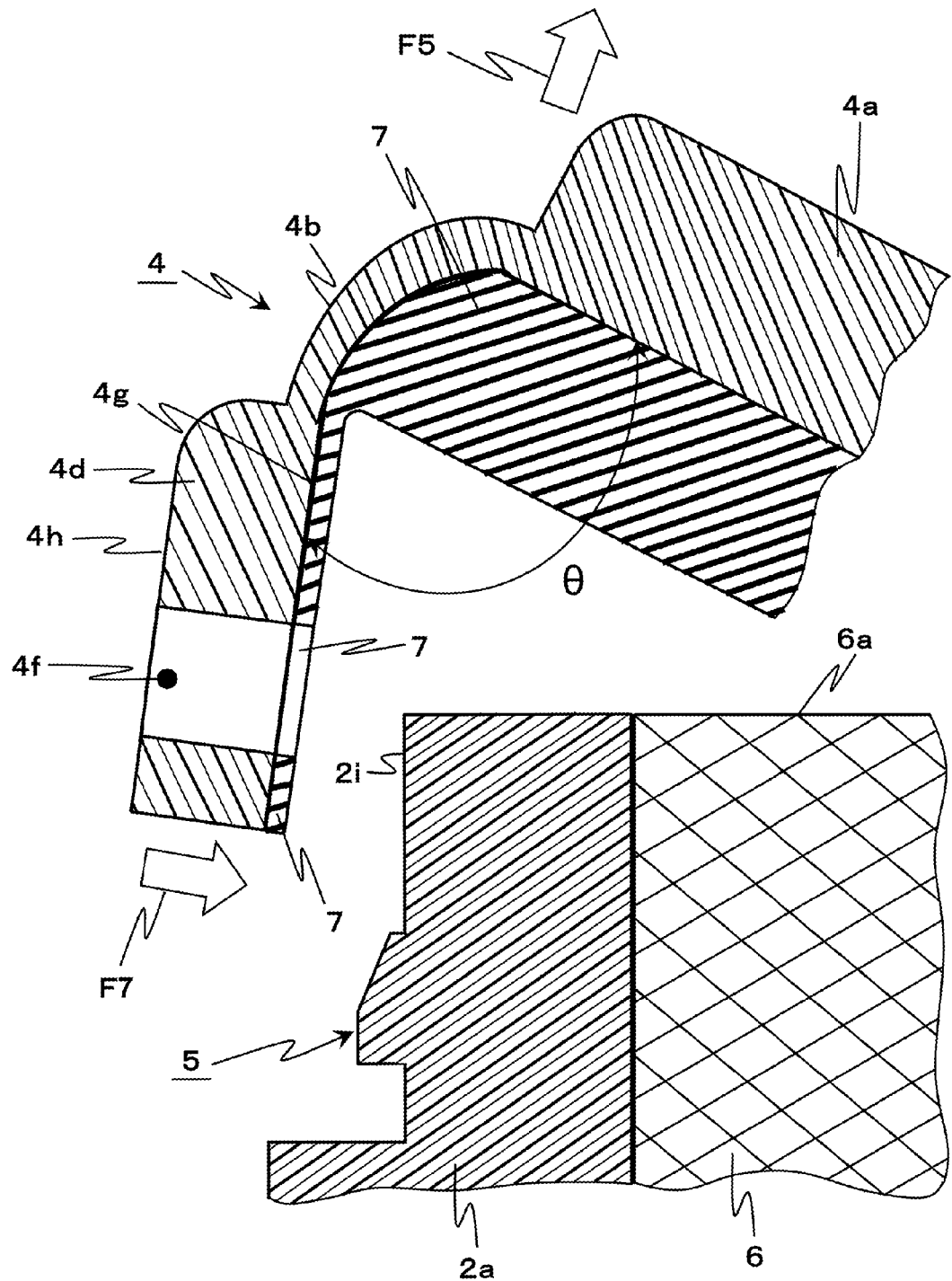
FIG. 4C is a cross-sectional view of the main portion in a state where the lid component for the PC has been detached from the casing.

By the force F6 being thus applied to the engaging portion 4*d*, sliding of the first engaging surface 4*i* on the first engaged surface 5*a* is canceled, and the lid portion 4*a* acts so as to apply the force F5 in such a direction as to uncover the battery insertion/detachment opening 6*a*, due to the first bent portion 4*c*. Thus, as shown in FIG. 4C, the engaging portion 4*d* is moved apart from the engaging portion opposing surface 2*i*. As a result, the battery 6 accommodated in the operation casing 2 can be taken out through the battery insertion/detachment opening 6*a*. After the engaging portion 4*d* has been moved apart from the engaging portion opposing surface 2*i*, an interior angle between the lid portion 4*a* and the engaging portion 4*d* is represented as θ. In the present embodiment, the second bent portion 4*b* performs restoration such that the interior angle θ between the lid portion 4*a* and the engaging portion 4*d* is less than or equal to 90 degrees.

Figure 4D:
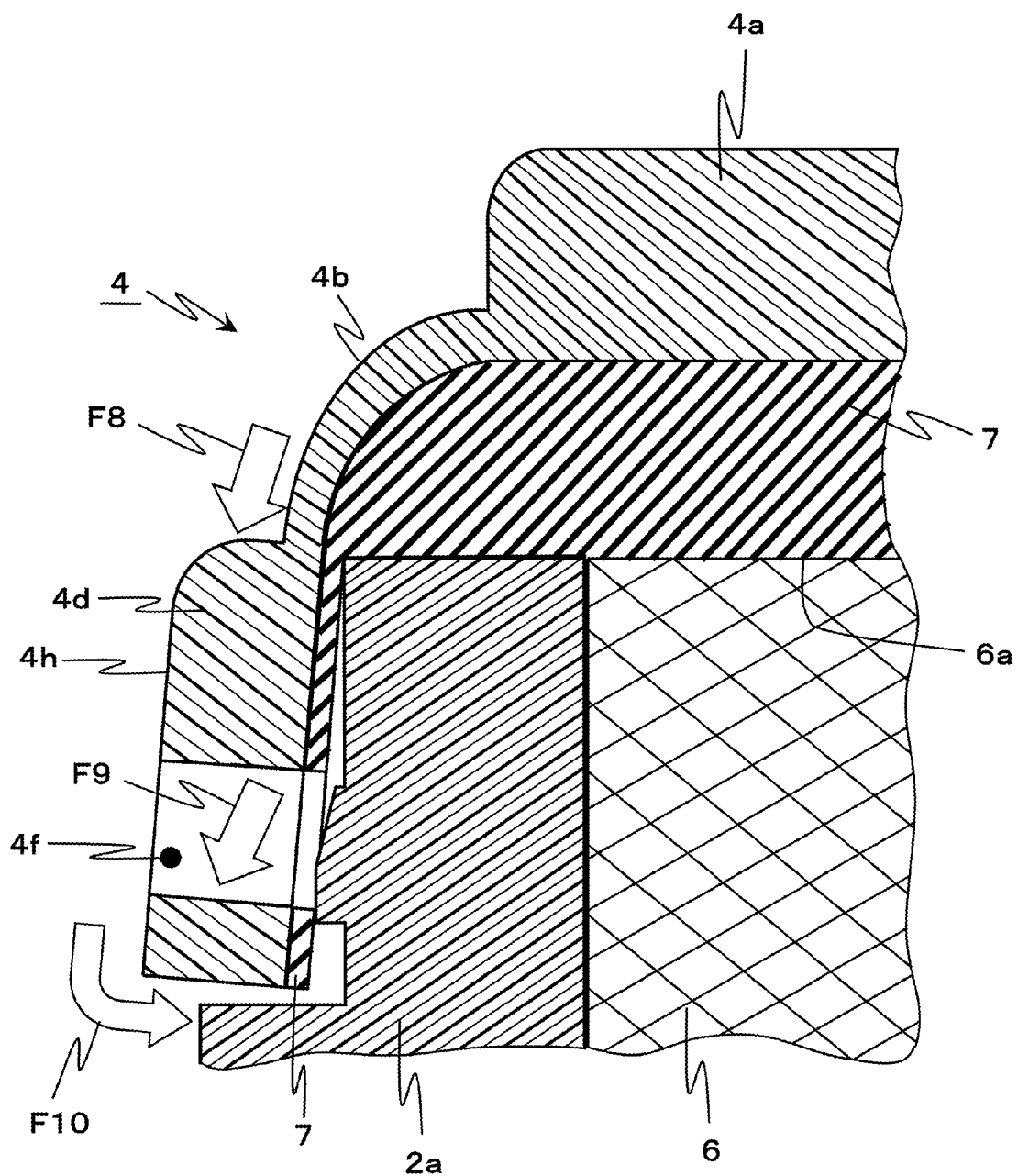
FIG. 4D is a cross-sectional view of a main portion for attaching the lid component to the casing of the PC.

Next, FIG. 4D shows an operation for causing the lid portion 4*a* to come into close contact with the battery insertion/detachment opening 6*a*. When the battery insertion/detachment opening 6*a* is covered with the lid portion 4*a*, a user presses a side surface of the engaging portion 4*d* on the second bent portion 4*b* side with a force F8. By the side surface being pressed, the water-sealing member 7 disposed between the lid portion 4*a*, and the top surface 2*a* and the battery insertion/detachment opening 6*a* is pressed. By the water-sealing member 7 being pressed and deformed, a force F9 is applied in the engagement hole 4*f* of the engaging portion 4*d*, and the engaged component 5 is inserted into the engagement hole 4*f*. Since, as described above, the interior angle θ between the lid portion 4*a* and the engaging portion 4*d* is less than or equal to 90 degrees, the force F9 is applied to the engaging portion 4*d* by the user merely pressing, with the force F8, the side surface of the engaging portion 4*d* on the second bent portion 4*b* side. Namely, application of the force F8 is transmitted as the force F9 applied in the engagement hole 4*f*. By the force F9 being applied in the engagement hole 4*f*, the boundary portion 4*j* (see FIG. 3A) is moved toward the first engaged surface 5*a* (see FIG. 3B) along the inclined surface 5*c* (see FIG. 3B). When the boundary portion 4*j* has been moved beyond the flat surface 5*b* on the first engaged surface 5*a* side due to a pressing force of the force F9, the engaging portion 4*d* is moved toward the engaging portion opposing surface 2*i* due to a force F10. Thus, the engaged component 5 can be inserted into the engagement hole 4*f* of the engaging portion 4*d*. Namely, the interior angle between the engaging portion 4*d* and the lid portion 4*a* is less than or equal to 90 degrees in a state where the lid portion 4*a* is removed from the battery insertion/detachment opening 6*a*, and thus the engaging portion 4*d* can be easily engaged with the engaged component 5.

Figure 4E:
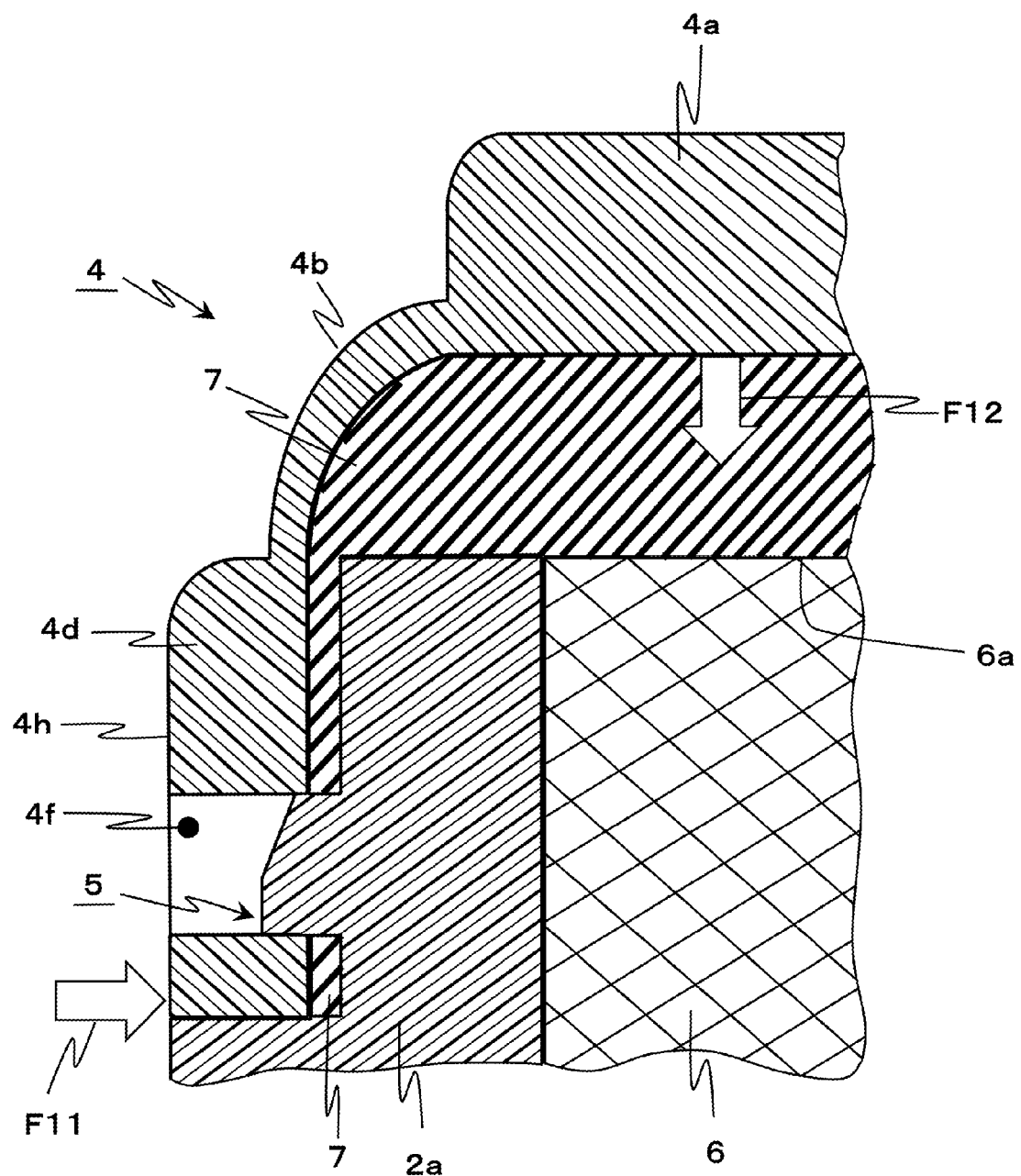
FIG. 4E is a cross-sectional view of the main portion in which the lid component has been attached to the casing of the PC.

The force F10 is applied as a force F11 as shown in FIG. 4E after the boundary portion 4*j* has been moved beyond the flat surface 5*b* on the first engaged surface 5*a* side. The force F11 is applied so as to insert the engaged component 5 into the engagement hole 4*f*, and thus the engaging portion 4*d* engages with the engaged component 5. Namely, the first engaging surface 4*i* comes into close contact with the first engaged surface 5*a*. In such a structure, the water-sealing member 7 is pressed against the battery insertion/detachment opening 6*a*, with a force F12, by the lid portion 4*a*, thereby sealing the battery 6 accommodated in the operation casing 2 from water. In the present embodiment, the second engaged surface 5*d* is included in the engaged component 5. When the second engaged surface 5*d* is formed, the second engaged surface 5*d* can be in close contact with the second engaging surface 4*k*, thereby assuredly inserting the engaged component 5 into the engagement hole 4*f*. However, the second engaged surface 5*d* may not be provided. Namely, also in a case where the inclined surface 5*c* is inclined immediately from the engaging portion opposing surface 2*i*, when the first engaged surface 5*a* is in close contact with the first engaging surface 4*i*, the battery insertion/detachment opening 6*a* can be sealed by the lid portion 4*a*. As shown in FIG. 3B, the height of the first engaged surface 5*a* from the engaging portion opposing surface 2*i* is greater than the height of the second engaged surface 5*d* from the engaging portion opposing surface 2*i*. Thus, the top surface opposing face 4*g* and the boundary portion 4*j* of the engaging portion 4*d* can be slid on the inclined surface 5*c* and the flat surface 5*b*, and the boundary portion 4*j* is moved along the first engaged surface 5*a*, to insert the engaged component 5 into the engagement hole 4*f*, and can abut against the engaging portion opposing surface 2*i*.

As described above, the engaged components 5 formed in the top surface 2*a* of the operation casing 2 are inserted into and detached from the engagement holes 4*f* of the lid component 4, thereby covering the battery insertion/detachment opening 6*a* with the lid portion 4*a* or removing the lid portion 4*a* to uncover the battery insertion/detachment opening 6*a*. Further, the battery insertion/detachment opening 6*a* is pressed by the water-sealing member 7, and therefore the battery 6 vulnerable to liquids such as water can be sealed from water in a state where the lid portion 4*a* is closed. Namely, the lid component 4 is secured to the operation casing 2 at one end portion so as to be rotatable, and is engaged with the operation casing 2 from three directions except for the one end portion, to be kept pressed against the water-sealing member 7. Therefore, when the lid component 4 is engaged with the operation casing 2, waterproof property can be realized.

[Modification 1]

Figure 5:
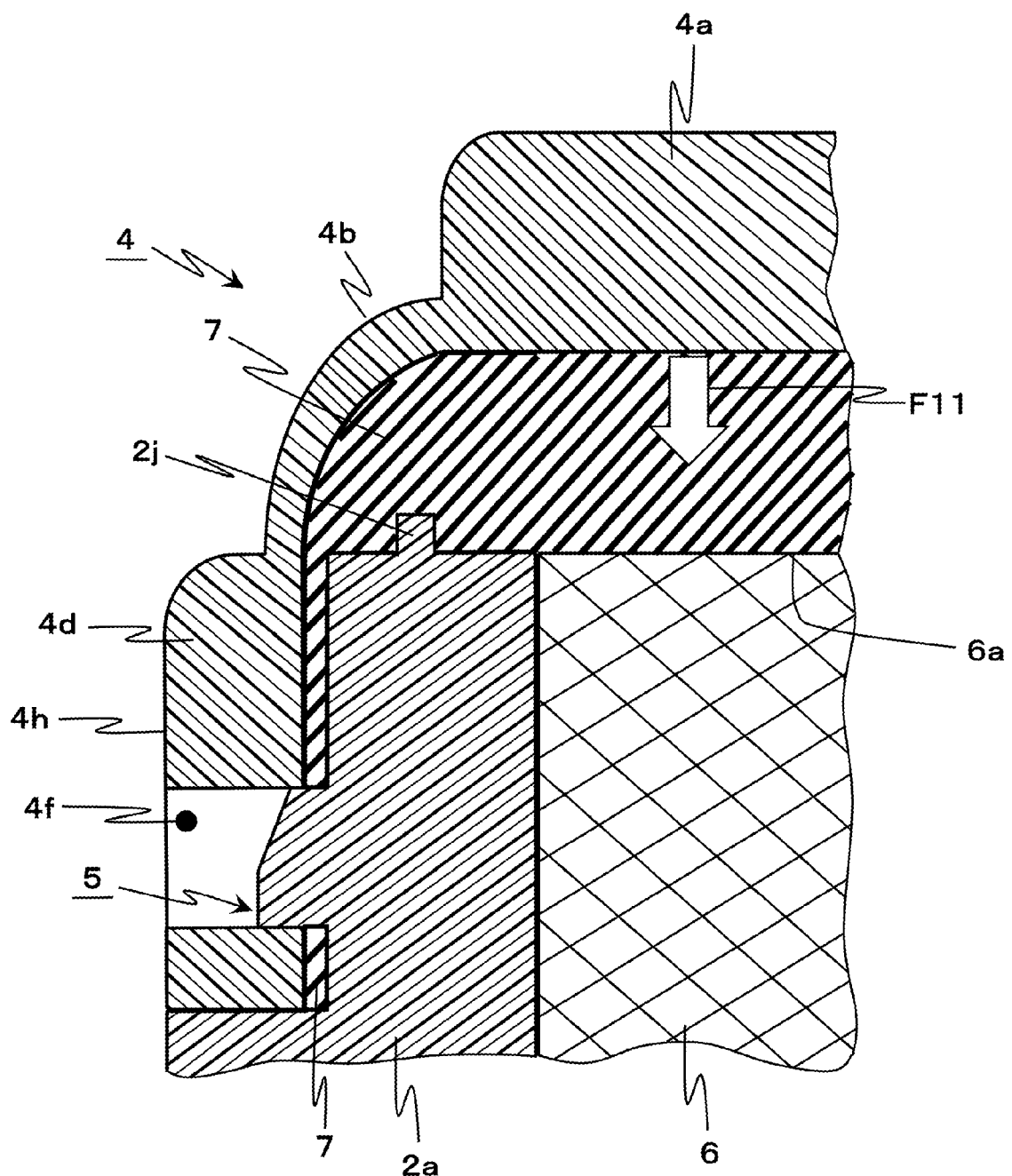
FIG. 5 is a cross-sectional view of main components of another PC.

FIG. 5 shows another embodiment in which the battery insertion/detachment opening 6*a* is sealed by the lid portion 4*a*. In FIG. 5, the same components as shown in FIG. 4A are denoted by the same reference numerals, and the description thereof is not given. In modification 1, a rib 2*j* is formed on a surface of the operation casing 2 which opposes the lid portion 4*a*. Although the rib 2*j* in the top surface 2*a* is shown, the rib 2*j* is formed so as to project toward the lid portion 4*a* and surround the battery insertion/detachment opening 6*a* on the back surface 2*d* and the right side face 2*g*.

Thus, in a state where the battery insertion/detachment opening 6*a* is covered with the lid portion 4*a*, the rib 2*j* that projects toward the lid portion 4*a* abuts against the water-sealing member 7. The rib 2j that abuts against the water-sealing member 7 is buried in the water-sealing member 7 since a force F12 is applied from the lid portion 4a toward the battery insertion/detachment opening 6a. Therefore, by the rib 2j being buried in the water-sealing member 7, a water-sealing performance for the battery 6 can be improved.

In modification 1, the number of the ribs 2j is one. However, the number of the ribs 2j is not limited to any specific number. Further, the height of the rib 2j from a surface on which the rib 2j is formed, and a width of the rib 2j along the surface on which the rib 2j is formed may be determined according to deformation, due to a stress, of the water-sealing member 7 to be used. Further, in modification 1, the rib 2j is disposed apart from the battery insertion/detachment opening 6a toward the engaging portion 4d. However, this is one example. The rib 2j may be disposed on, for example, the outer circumference of the battery insertion/detachment opening 6a.

[Modification 2]

Figure 6A:
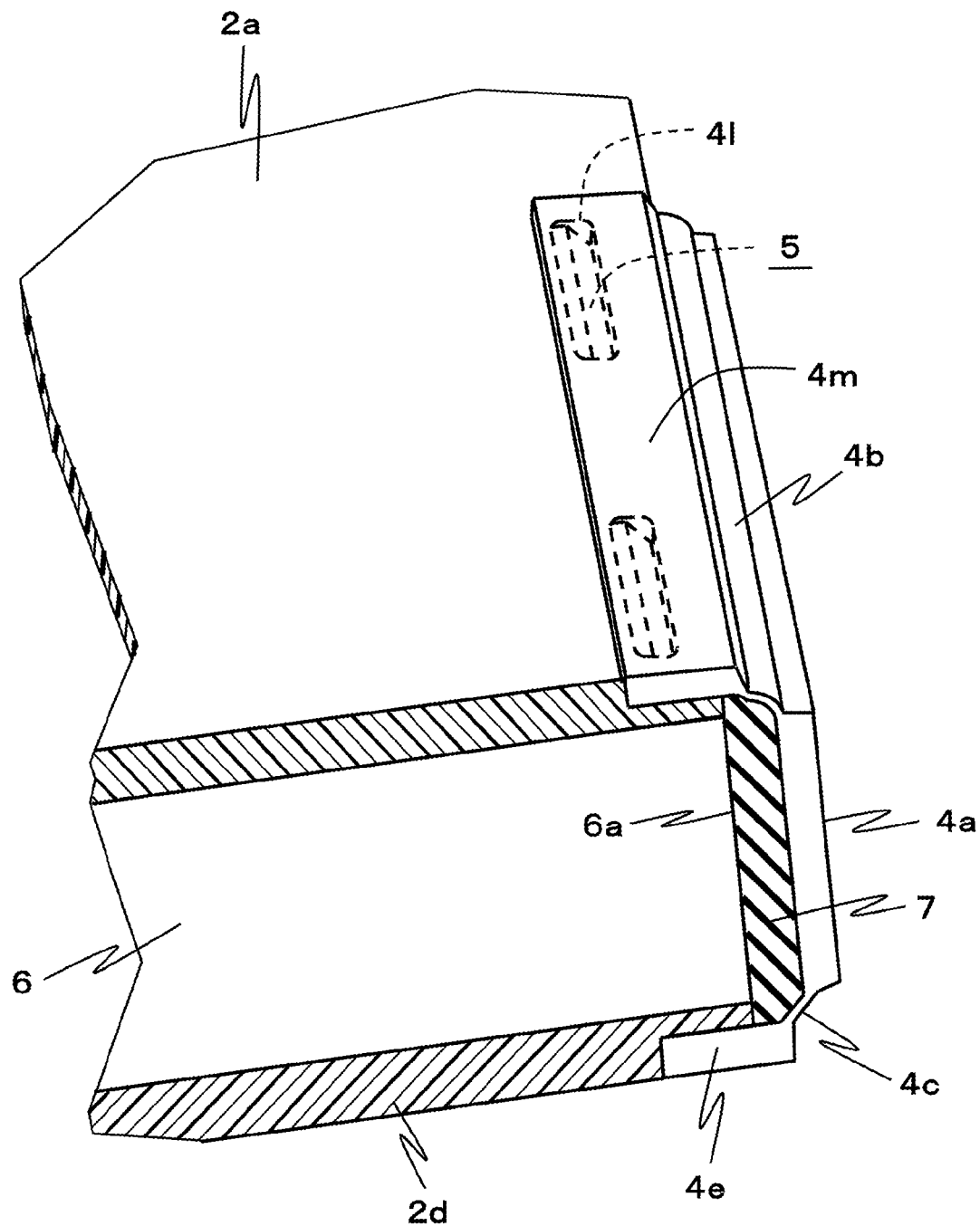
FIG. 6A is a cross-sectional perspective view of main components of another PC.

In the above description, the engagement holes 4f pass through the engaging portion 4d from the front layer face 4h to the top surface opposing face 4g. However, this is one example. In another exemplary embodiment, as shown in FIG. 6A, an engaging portion 4m may be formed which does not allow holes to pass through the front layer face 4h portion. In the engaging portion 4m, engagement holes 4l into which the engaged components 5 are inserted are closed at the upper portions of the engagement holes 4l. By the engagement holes 4l being closed, a mechanical strength of the engaging portion 4m can be enhanced. For example, when the side surface on the second bent portion 4b side is pressed as shown in FIG. 4A and FIG. 4D, deformation of the engaging portion 4m due to the applied force can be reduced. The depth of each engagement hole 4i from the top surface opposing face 4g (see FIG. 3A) is determined according to, for example, the height of the flat surface 5b from the engaging portion opposing surface 2i (see FIG. 3B) of the engaged component 5, or the force F4 (see FIG. 4B) of the water-sealing member 7 and the force F5 applied to the lid portion 4a.

Figure 6B:
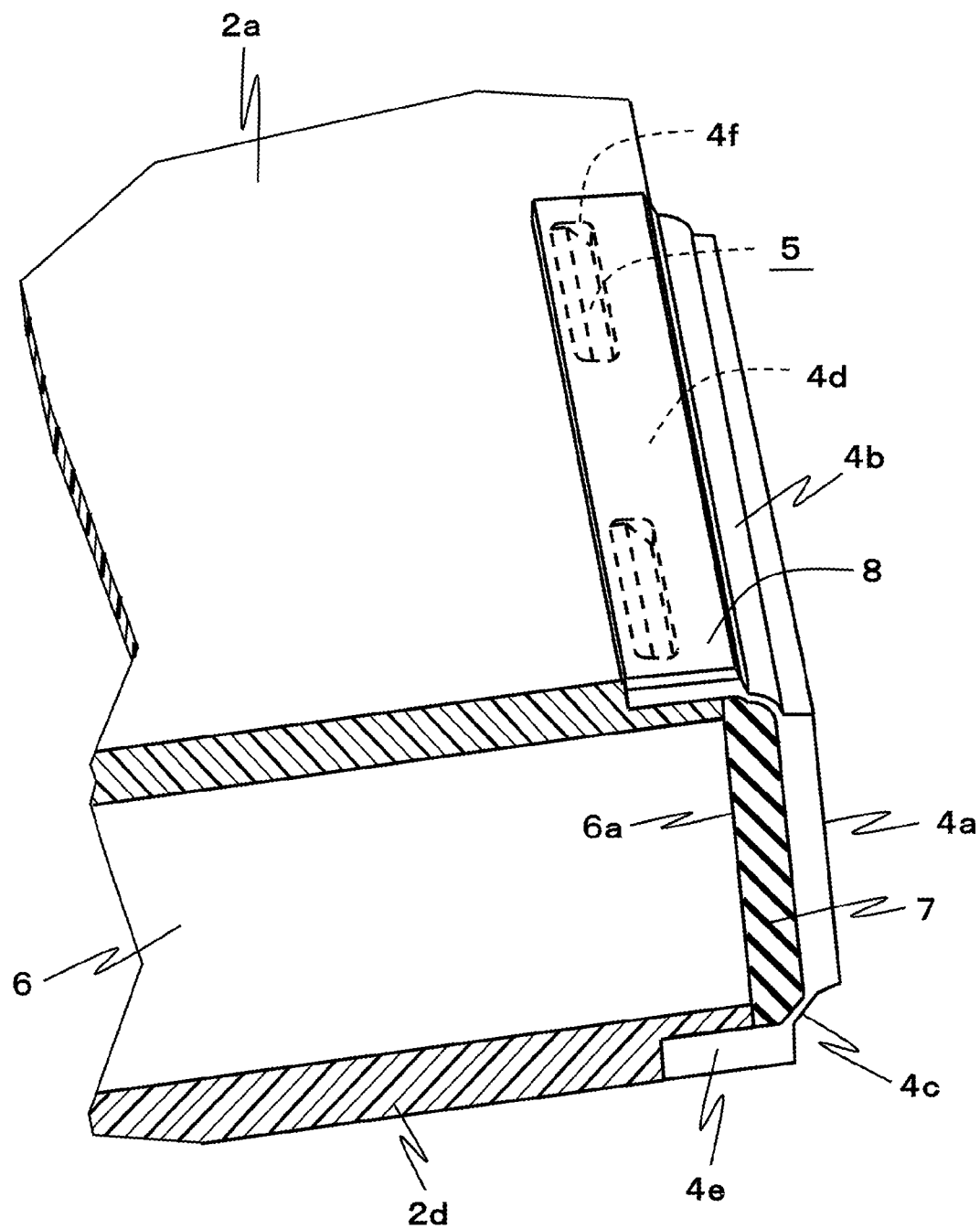
FIG. 6B is a cross-sectional perspective view of main components of another PC.

Further, as shown in FIG. 6B, a plate-shaped component 8 may be provided on the front layer face 4h of the engaging portion 4d which includes the engagement holes 4f that pass through the engaging portion 4d from the front layer face 4h to the top surface opposing face 4g. For the plate-shaped component 8, for example, a material used for the operation casing 2, such as an acrylonitrile-styrene copolymer, which has a strength higher than that of the engaging portion 4d may be used. Further, the plate-shaped component 8 and the engaging portion 4d may be integrated with each other by, for example, adhesion. When the plate-shaped component 8 is thus used, a mechanical strength can be enhanced in a range of the engaging portion 4d, and when the side surface of the engaging portion 4d on the second bent portion 4b side is pressed, deformation of the second bent portion 4b can be reduced due to the strength of the plate-shaped component 8. Thus, the engaged components 5 can be inserted into the engagement holes 4l similarly to the engagement holes 4f as shown in, for example, FIGS. 4A and 4E. Further, for example, when a user presses the plate-shaped component 8 on the second bent portion 4b side in a state shown in FIG. 4A, the engaged components 5 can be inserted into the engagement holes 4f of the engaging portion 4d. Namely, operability for inserting the engaged components 5 can be improved.

[Modification 3]

Figure 7:
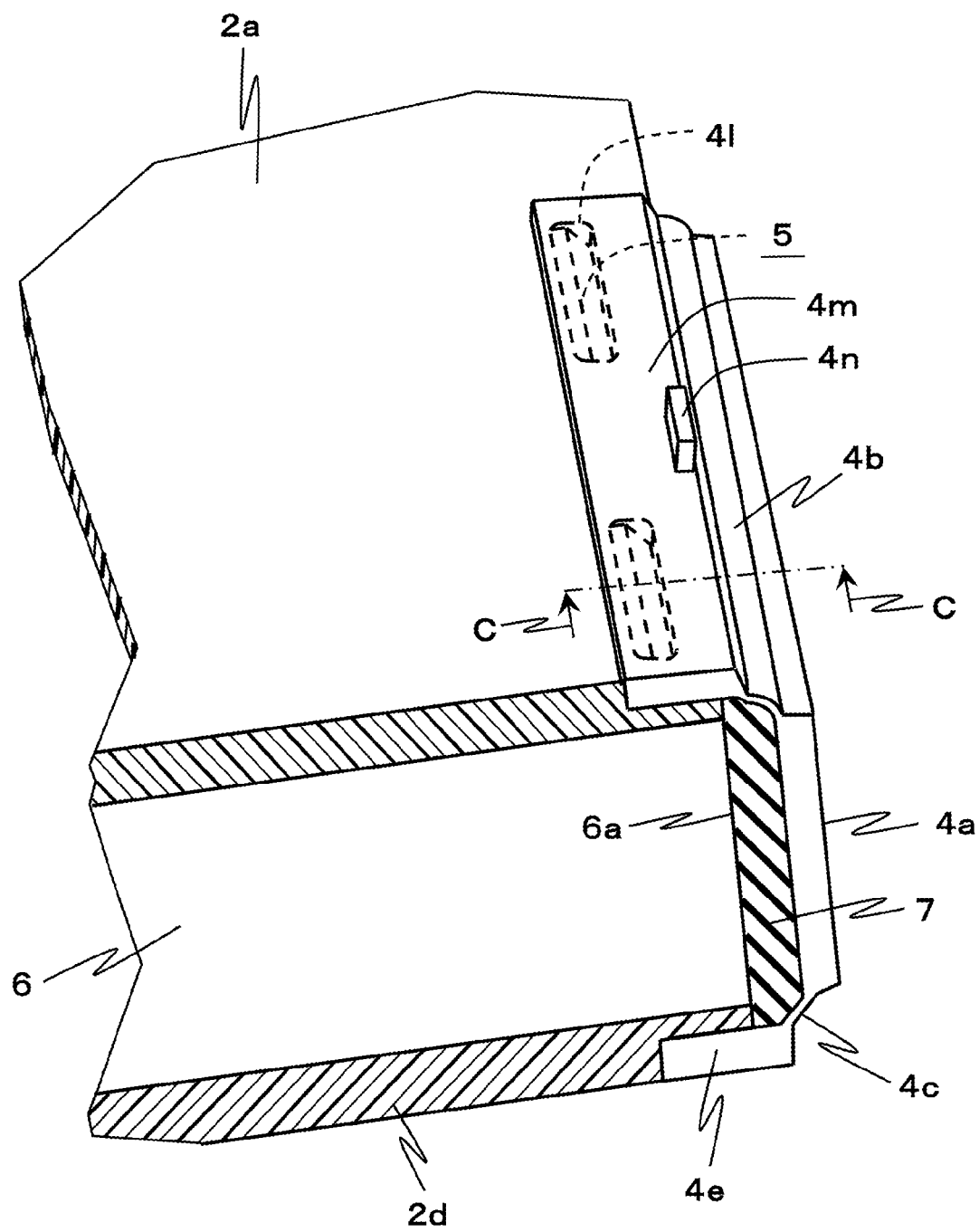
FIG. 7 is a cross-sectional perspective view of main components of another PC.
Figure 8A:
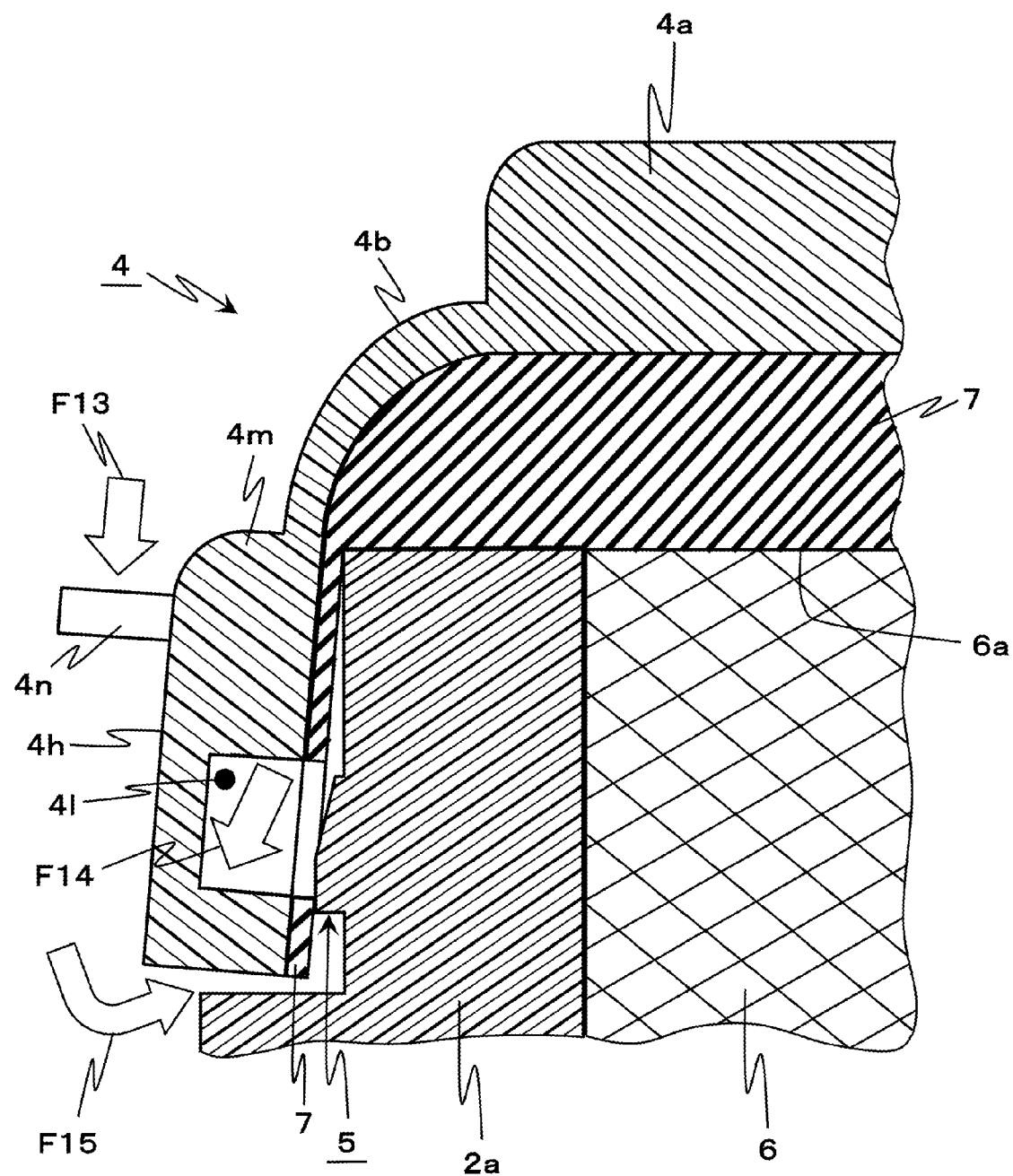
FIG. 8A is a cross-sectional view of main components for attaching a lid component to the casing of the PC.
Figure 8B:
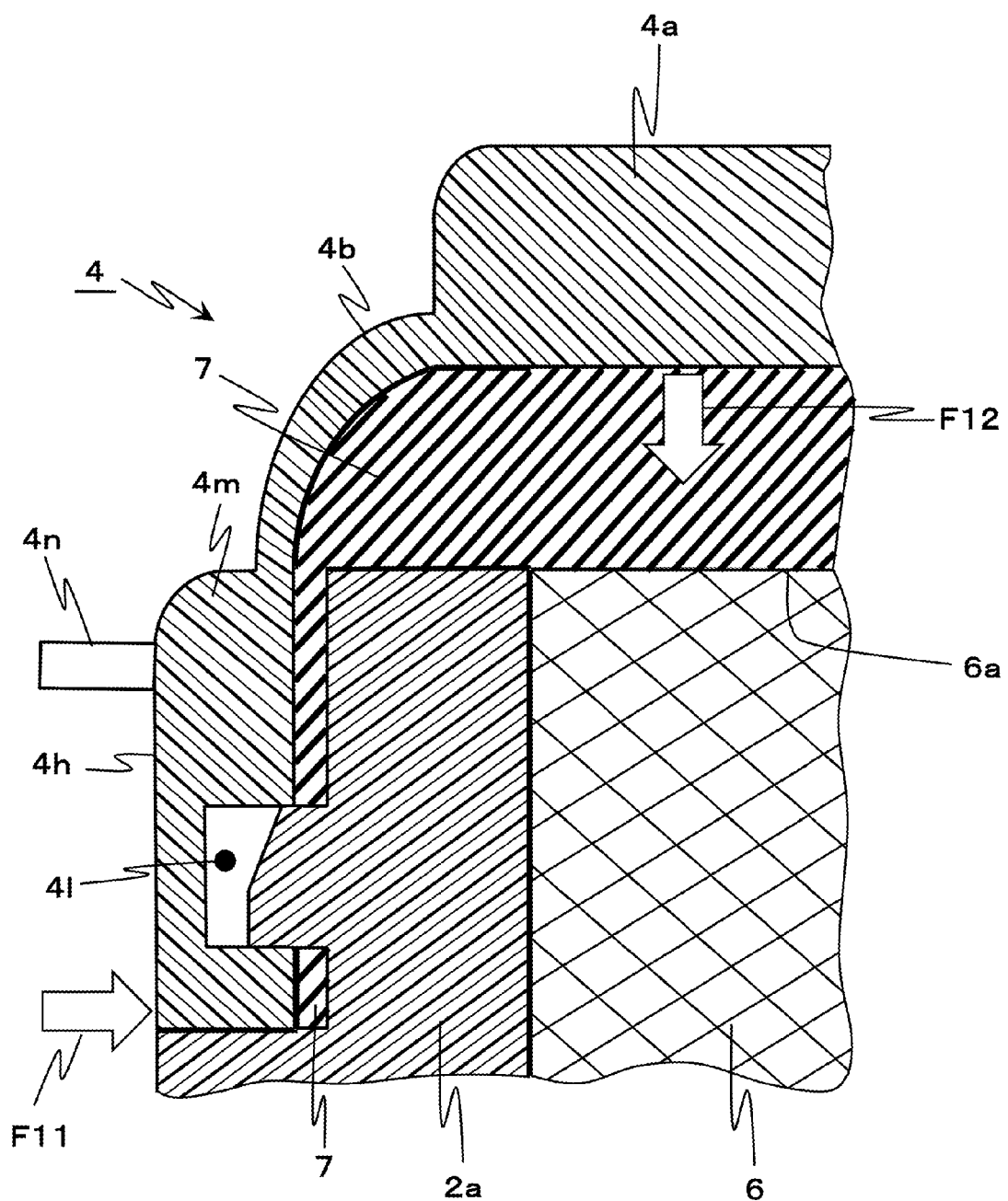
FIG. 8B is a cross-sectional view of the main components in a state where the lid component has been attached to the casing of the PC.

When the engaged components 5 are inserted into the engagement holes 4l of the engaging portion 4m, a user presses, with her/his finger, the side surface of the engaging portion 4m on the second bent portion 4b side, as shown in, for example, FIG. 6A. When the side surface of the engaging portion 4m is pressed by the user's finger, the pad of the user's finger engages with the front layer face of the engaging portion 4m. An exemplary case where a projection 4n with which the user's finger engages is disposed on the engaging portion 4m is indicated in FIG. 7. As shown in FIG. 7, in modification 3, the projection 4n is disposed on the front layer face of the engaging portion 4m. In FIG. 7, the same components as shown in FIG. 6A are denoted by the same reference numerals, and the description thereof is not given. FIG. 8A and FIG. 8B are fragmentary views taken in the direction of arrows C-C in FIG. 7. In FIG. 8A and FIG. 8B, the same components as shown in FIG. 4A and FIG. 4E are denoted by the same reference numerals, and the description thereof is not given.

When the projection 4n is provided, a user is allowed to press, with the pad of her/his finger, the side surface of the engaging portion 4m on the second bent portion 4b side by pressing the projection 4n as shown in FIG. 8A. Namely, by the projection 4n being pressed with a force F13, a force F14 is applied in the engagement hole 4i. By the force F14 having been applied, the boundary portion 4j is slid on the inclined surface 5c and the flat surface 5b of the engaged component 5. After the boundary portion 4j has been slid on the flat surface 5b, the first engaging surface 4i comes into close contact with the first engaged surface 5a due to a force F15. Thus, as shown in FIG. 8B, the engaged components 5 are accommodated in the engaging portion 4m, and the battery insertion/detachment opening 6a is covered with the lid portion 4a. Namely, the engaged components 5 can be inserted into the engaging portion 4m by a user pressing the projection 4n. Further, when the lid portion 4a is removed in the state shown in FIG. 8B to uncover the battery insertion/detachment opening 6a, a force opposite to the force F13 in FIG. 8A is applied by a user to the projection 4n, thereby disengaging the engaged components 5 and the lid component 4 from each other. Namely, application of the force opposite to the force F13 to the projection 4n is equivalent to, for example, pressing action due to the force F14, and sliding of the boundary portion 4j on the inclined surface 5c is canceled, and disengagement of the engaged component 5 from the engagement hole 4i can be facilitated. Namely, when a user presses the projection 4n, the engaged components 5 can be disengaged from the engagement holes 4l according to the principle of leverage in which a position of the projection 4n in the engaging portion 4m functions as a pivot. As a result, an operability for inserting and detaching the engaged components 5 can be improved.

In the above description, the projection 4n is formed as a component different from the engaging portion 4m. However, the projection 4n and the engaging portion 4m may be integrated into one component. Further, in the above description, the shape of the projection 4n is a rectangular parallelepiped. However, the projection 4n may have any shape, such as a triangular prism, which can fit well with the pad of a user's finger. In the embodiment described above, the engaging portion 4m including the engagement holes 4l is used. However, the engaging portion 4d including the engagement holes 4f may be used.

Figure 9:
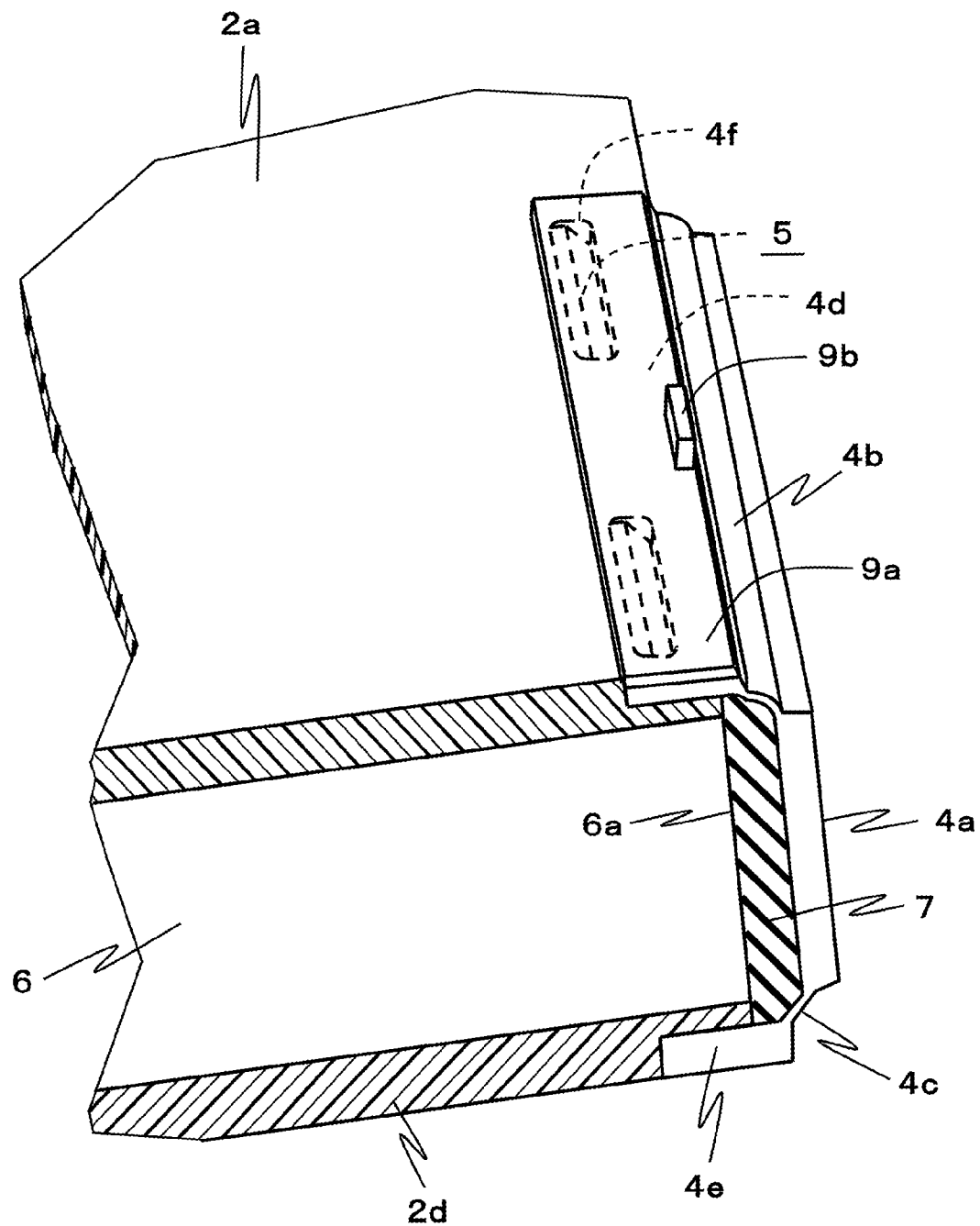
FIG. 9 is a cross-sectional perspective view of main components of another PC.

In the embodiment described above, the projection 4n is disposed on the front layer face 4h of the engaging portion 4m. However, as shown in FIG. 9, a plate-shaped component 9a may be provided on the front layer face 4h of the engaging portion 4d. The plate-shaped component 9a is, for example, adhered to the front layer face 4h of the engaging portion 4d in the same manner as in FIG. 6B. In this structure, a projection 9b is disposed on a front layer face of the plate-shaped component 9a on the engaging portion 4d. The projection 9b may be formed and adhered as a component different from the plate-shaped component 9a. Alternatively, for example, the projection 9b may be integrated with the plate-shaped component 9a. In modification 3, the projection 9b allows an operability for inserting and detaching the engaged components 5 to be improved, similarly to the projection 4n as described above.

Further, the lid portion 4a, the engaging portion 4d, and the securing portion 4e may be formed by a highly hard material which is used for, for example, the top surface 2a and the back surface 2d of the operation casing 2. Examples of the highly hard material include organic resins such as acrylonitrile-styrene copolymers, styrene-butadiene-acrylonitrile copolymers, and polyethylene terephthalate resins, and metal materials such as metal aluminium, aluminium alloys, metal magnesium, and magnesium alloys.

In the embodiment described above, the first engaging surface 4i of each engagement hole 4f in the engaging portion 4d and the first engaged surface 5a of each engaged component 5 are non-inclined surfaces. However, this is one example. For example, the first engaging surface 4i and the first engaged surface 5a may be inclined in such a direction as to engage the engaging portion 4d and the engaged components 5 with each other.

In the embodiment described above, the rib 2j is disposed apart from the circumference of the battery insertion/detachment opening 6a. As a result, the rib 2j is buried in the water-sealing member 7, and therefore misalignment of the water-sealing member 7 due to, for example, lateral vibration of the PC and the like caused by disturbance, which may be followed by oscillation of the battery 6 incorporated in the PC, can be reduced. The rib 2j may be disposed on the circumference of the battery insertion/detachment opening 6a. Further, in the embodiment described above, the number of the ribs 2j is one. However, the number of the ribs 2j is not limited to any specific number. For example, the number of the ribs 2j may be two such that one of the ribs 2j is disposed on the circumference of the battery insertion/detachment opening 6a, and the other of the ribs 2j is disposed apart from the circumference of the battery insertion/detachment opening 6a. Further, in the embodiment described above, the water-sealing member 7 is in close contact with the engaging portion 4d and the lid portion 4a. When the water-sealing member 7 is disposed between the top surface 2a and the lid portion 4a, water-sealing property for the battery 6 can be assuredly obtained. Therefore, the water-sealing member 7 may not be in close contact with the engaging portion 4d and the lid portion 4a. Namely, the water-sealing member 7 may be disposed in close contact with the lid portion 4a and the top surface 2a, or in close contact with the lid portion 4a, the top surface 2a, and at least one of the back surface 2d and the right side face 2g. Further, the water-sealing member 7 may be disposed in close contact therewith by, for example, adhesion using an adhesive, and two-color molding.

In the embodiment described above, the battery 6 is covered with the lid component 4. However, the battery 6 is described as an example. For example, ports and terminals such as USB (Universal Serial Bus) ports, wired and wireless LAN (Local Area Network) ports, and cable connector terminals, and connection portions in which upper casings and lower casings are connected to each other, may be covered.

In the embodiment described above, a laptop type computer in which a display panel and an operation casing are engaged with each other so as to be rotatable is described. However, this is one example. The computer may be, for example, a tablet type computer, or a convertible computer that can switch between a tablet type computer and a laptop type computer. Further, the embodiments described above are applicable to electronic devices, other than computers, such as mobile electronic devices including mobile telephones and hand-held game machines, and electronic devices in which upper casings and lower casings are connected to each other so as to be sealed from water. Further, the operation casing is an embodiment of a casing.

As described above, the embodiment and modifications 1 to 3 have been descried above as examples of the technology disclosed in the present application. However, the technology according to the present disclosure is not limited to the embodiment and the modifications, and is also applicable to other embodiments implemented by modifications, replacements, additions, omissions, or the like as appropriate. Furthermore, another exemplary embodiment can be implemented by combining the components described above for the embodiment and modifications 1 to 3.

As presented above, one embodiment has been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

As described above, the electronic device according to the present disclosure is widely applicable to, for example, laptop type computers, tablet-type computers, mobile telephones, hand-held game machines, and electronic devices in which upper casings and lower casing are connected to each other so as to be sealed from water.

What is claimed is:

1. An electronic device comprising:
   a casing including a side surface, a top surface, and a back surface;
   a lid component configured to cover an opening formed in the side surface of the casing; and
   a projecting component formed on the top surface of the casing, wherein
   the lid component includes:
      a securing portion secured to the back surface of the casing;
      a lid portion configured to cover the opening of the casing;
      a ring-shaped engaging portion having an engagement hole that engages with the projecting component of the casing;
      a first bent portion configured to connect between the securing portion and the lid portion, and formed by thinning a part of the lid portion, and
      a second bent portion configured to connect between the lid portion and the ring-shaped engaging portion, formed by thinning apart of the lid portion,
   the securing portion, the lid portion, the engaging portion, the first bent portion, and the second bent portion being integrated into the lid component, and the projecting component being inserted into the engagement hole by the ring-shaped engaging portion moving to cover the projecting component in a direction from the side surface having the opening formed therein toward a middle of the casing.

2. The electronic device according to claim 1, wherein an elastic water-sealing member is disposed between the opening and the lid portion.

3. The electronic device according to claim 2, wherein the projecting component has a surface exposed so as to face upward from the top surface of the casing, the surface including an inclined surface that is inclined downward to the side surface having the opening formed therein.

4. The electronic device according to claim 3, wherein, when the lid component is pressed toward the opening, an edge of the engaging hole that faces the side surface having the opening formed therein moves onto the surface of the projecting component exposed so as to face upward from the top surface of the casing, to disengage the engaging portion from the projecting component.

5. The electronic device according to claim 2, wherein a rib is provided between the water-sealing member and the opening.

6. The electronic device according to claim 1, wherein the lid component has a projection standing perpendicular to the top surface of the casing.

7. The electronic device according to claim 1, wherein the engaging portion comprises a first surface that overlies the top surface of the casing when the engagement hole is engaged with the projecting component.

8. The electronic device according to claim 1, wherein the lid component is made of an elastomeric resin and in a relaxed state the lid portion and the engaging portion define an interior angle of 90 degrees or less.

9. The electronic device according to claim 1, wherein the top surface of the casing comprises a recessed area, the projecting component is formed within the recessed area, and the engaging portion of the lid fits in the recessed portion when the engagement hole is engaged with the projecting component.

* * * * *